(No Model.)
S. H. CHASE.
SAW BIT HOLDER.
No. 435,556.  Patented Sept. 2, 1890.
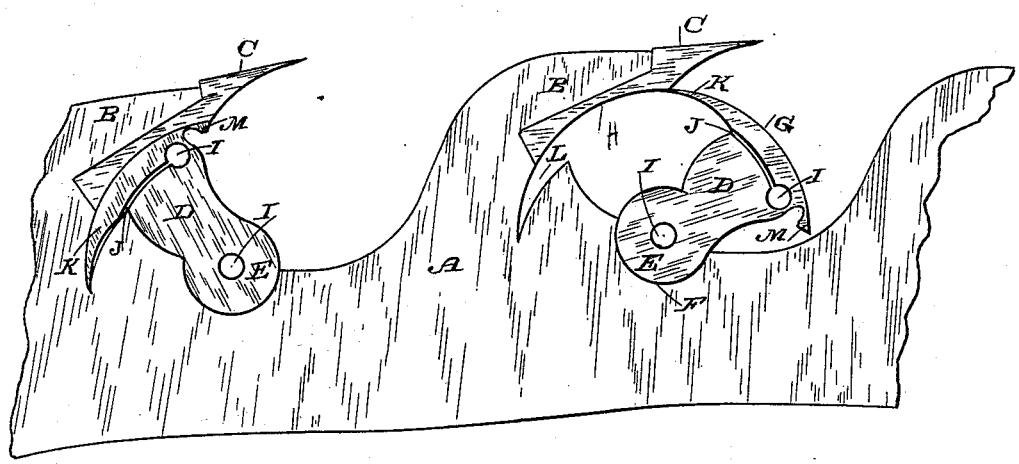
Witnesses:
Geo. H. Strong.
J. H. Krouse
Inventor,
Stephen H. Chase
By Dewey & Co.
Att'ys

UNITED STATES PATENT OFFICE.

STEPHEN H. CHASE, OF SAN JOSÉ, CALIFORNIA.

SAW-BIT HOLDER.

SPECIFICATION forming part of Letters Patent No. 435,556, dated September 2, 1890.

Application filed January 27, 1890. Serial No. 338,272. (No model.)

*To all whom it may concern:*

Be it known that I, STEPHEN H. CHASE, a citizen of the United States, residing at San José, Santa Clara county, State of California, have invented an Improvement in Saw-Bit Holders; and I hereby declare the following to be a full, clear, and exact description of the same.

My invention relates to an improved device for holding removable saw-bits in the saw-plate.

It consists of a locking-plate having a circular inner end adapted to turn in a correspondingly-shaped groove in the throat of the tooth-opening, and having the outer end in the form of a circular concentric segment adapted to fit the corresponding curve of the saw-bit, and an elastic spur or projection from the segmental head, which fits into a corresponding channel made in the saw-plate.

Referring to the accompanying drawing for a more complete explanation of my invention, the figure shows a section of a saw-plate with the tooth-openings and two of the saw-bits in place, with the two holders, one being engaged and the other disengaged.

A is a saw-plate having the usual projections and throats forming the teeth of the saw. Upon the ends of the projections or teeth B thus formed are fitted the saw bits or cutters C. The backs of these cutters are grooved and the corresponding edges of the saw-teeth are made V-shaped to correspond with these grooves and to hold them in their places, or, if desired, the grooves may be made in the teeth and the V-shaped form in the bits.

The bit-holder consists of a piece of steel D, having the inner end formed into a circular head E. The saw-plate has a semicircular or segmental channel F made in it of the same shape and size to correspond with the head E, and the head and the channel are tongued and grooved in the same manner as the rear portion of the saw-bits and the saw-tooth, so as to hold the plate in place. The outer end of the plate D is also in the form of a circular segment, as shown at G, the curve being formed on a radius from the center of the head E, with which head the periphery is concentric. The inner face of the saw-bit C is correspondingly curved, as shown at H, so that when the plate D is turned so as to force the segment G beneath the bit C it follows the curve H, and thus forces the bit strongly into its seat against the tooth B.

I I are holes made in the plate D, into which a spanner may be introduced for the purpose of turning this plate to either lock or unlock the bit. From the outer of these holes I a slot J is cut, extending from the hole to the rear edge of the plate D, and the outer curved periphery G of the plate is extended beyond the termination of this slot, so as to form a curved spur or tang K. The saw-plate has a slot L cut it, corresponding in shape with this tang, which tapers to a point, so that as the plate D is turned the outer segment G and the tang K have an elastic pressure against the inside of the bit. As the tang enters the slot L, it is slightly forced outward just as it reaches the bottom of the slot by making the inner curve of the slot of such a radius as to press the tang outwardly and cause it to fit snugly within the inner curve H of the bit. If it be found necessary, the outer end M of the curved periphery G may be made elastic by cutting away the inner portion of the curve of the plate, as shown, so that the point M will press against the bit and lock the plate in place, so as to prevent it and the bit from being displaced while the saw is running.

Any of the plates D may be turned to release any bit which it is necessary to remove or replace by means of the spanner, and a new bit being placed in its seat the plate is turned back again, so as to lock it in place.

Having thus described my invention, what I claim as new, and desire to secure by Letters Patent, is—

1. A saw-bit holder consisting of a plate having its inner end made circular and fitting a corresponding channel or groove in the saw-plate and the outer end curved and having the elastic tang or spur K, adapted to enter a corresponding slot in the throat of the saw-plate and behind the bit, substantially as herein described.

2. The combination, with a saw-plate and a saw-bit having a circular inner face, of a holder consisting of a plate the inner end of which is circular and fitted in a correspondingly-shaped groove in the saw-plate, and the outer end curved and adapted to fit a correspondingly-curved portion on the body of the saw-bit, and having a projecting elastic spur or tang adapted to enter a corresponding slot made in the saw-plate beneath and behind the bit, said slot being so curved as to force the periphery of the holder outward against the interior curve of the bit, substantially as herein described.

3. The combination, with the saw-plate and the saw-bit fitted thereto and having the interior circular curve, of a bit-holder consisting of a plate the inner end of which is circular and fitted into a corresponding groove between the teeth, the outer end forming a concentric segment having the projecting elastic spur K entering a corresponding slot in the saw-plate behind the bit, and the elastic front portion M, adapted to press against the front of the curve of the bit, substantially as herein described.

In witness whereof I have hereunto set my hand.

STEPHEN H. CHASE.

Witnesses:
L. H. DAY,
JOHN J. SEYMOUR.